(No Model.)

L. F. ACHORN.
SAW.

No. 465,051.  Patented Dec. 15, 1891.

Witnesses
Chas. P. Turner
A. F. Green

Inventor
Lowell F. Achorn
Attorneys
A. A. Woodson

United States Patent Office.

LOWELL F. ACHORN, OF SPANN, GEORGIA.

SAW.

SPECIFICATION forming part of Letters Patent No. 465,051, dated December 15, 1891.

Application filed December 29, 1890. Serial No. 376,117. (No model.)

*To all whom it may concern:*

Be it known that I, LOWELL F. ACHORN, a citizen of the United States, and a resident of Spann, in the county of Johnson and State of Georgia, have invented certain new and useful Improvements in Saws; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the class of circular saws having inserted teeth, the object being to so improve the construction of said devices as to render the teeth less liable to work loose, and thus prevent the straining, springing, and otherwise damaging of the saw-body and the interference thereby with the proper performance of its functions, and also making the saw, when worn, easily and cheaply reparable, all of which objects are accomplished by this present invention, which is hereinafter fully described.

Figure 1:
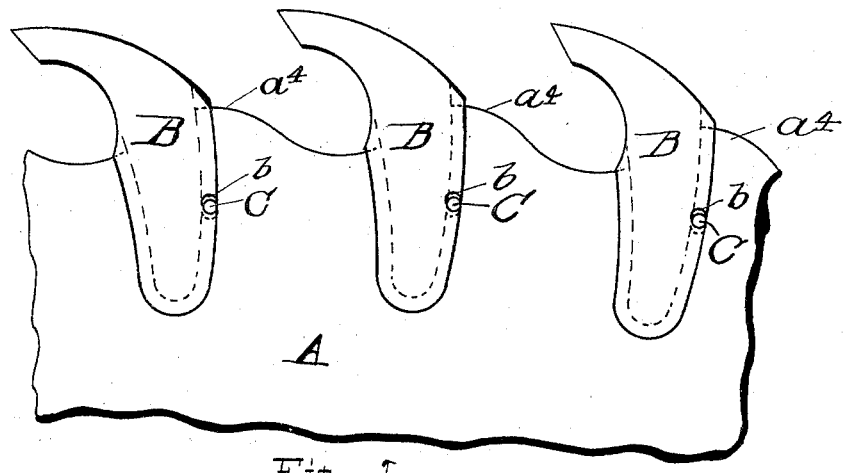
Figure 4:
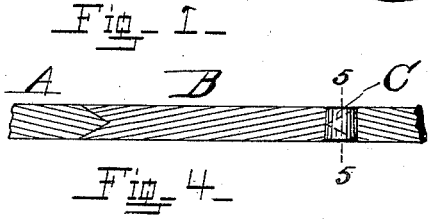
Figure 2:
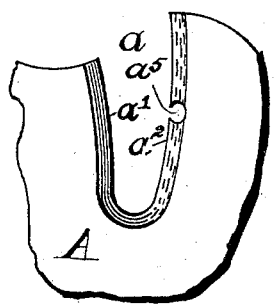
Figure 5:
Figure 3:
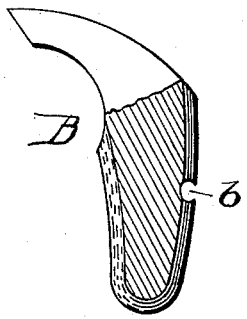

In the accompanying drawings, Figure 1 is a side elevation of a segmental section of the saw, showing three teeth in position. Fig. 2 is a segmental section of the saw-body with the teeth removed. Fig. 3 is a side elevation of the tooth, partly in section, more plainly showing the notch therein. Fig. 4 is a horizontal section through the tooth at the center of the rivet, also a portion of the saw-body, showing the beveled seat. Fig. 5 is a section on the line 5 5, Fig. 4, vertically through the center of the rivet.

In the figures corresponding elements are indicated by similar reference characters in all the views.

A is the blade, and B the tooth. The blade A is provided with a seat $a$ for the tooth, substantially radial in its position, having, as best shown in Fig. 2, a curved front side $a'$ and a side $a^2$. Side $a^2$ is also curved and forms the guide for the tooth in seating itself, the side $a'$ being so curved relatively to the side $a^2$ that the recess $a$ becomes wider as it approaches the periphery of the saw, which causes the tooth when forced in to firmly seat itself. The tooth is so formed in its taper as to seat itself upon said sides, and it is forced into the tapering recess so formed until it seats firmly against said sides. The part of the blade which is on the side $a^2$ extends outwardly from the center of the saw and materially strengthens the same, by reason of its affording a long bearing for the back of the tooth against the said blade and holding the tooth more firmly on account of its reaching very near a line touching the points of the teeth, and also that the line of strain tending to break said blade passes through solid metal and thence across the body of the tooth, where it bears solidly against the sides of the recess $a$, and thence on the center of the blade. It will also be seen that it opposes itself directly to the tearing out of the tooth in case any one of the interdental portions of the blade was in any case to become weak near the inner end of the tooth. The portions of the blade immediately surrounding the aperture $a$ are chamfered off in the usual manner, and the tooth has a corresponding notch extending around the portion contacting therewith. The pin C, of steel, is tapered and will enter a notch $a^5$ in the blade, the upper boundary metal of which notch should conform in shape to the cross-sectional contour of the said pin, as the pin has bearing there in operation. The portion of the tooth B which registers with the notch $a^5$ is also provided with a notch $b$, extending transversely of the tooth and elongated in a direction longitudinally of the body of the tooth in such a manner that the said notches $a^5$ and $b$ being brought into approximate juxtaposition the entry of the rivet C will, by reason of its taper and its bearing therein, force the seating of the tooth against the sides $a'$ and $a^2$, as hereinbefore described, said rivet being riveted at its smaller ends, all of which positively insures against the tooth coming loose or against any loose fit when the tooth is first inserted in the blade, which would tend to cause the tooth to work very much looser by continued service and cause it to do bad work at all times. Owing to the fact that the teeth are apt to be sprung and to be slightly variable in size, due to the process of hardening and tempering, this forcible seating in the tempered seat is of obvious advantage and of great importance. In the construction shown as to form of tooth and corresponding contour of recess, together with the position of the pin C, it is obvious that the pin C has no further function to perform while the saw is cutting than to resist the withdrawal of the tooth from the recess $a$ on a line of motion parallel to the side $a'$, the sides $a'$ and $a^2$ and their joinder curve sustaining the working strain of the tooth, and owing to the great radial projection of the part $a^4$ it is plain that the fulcrumal point of the tooth B as a lever is comparatively near to the line of strain on the operative portion of the tooth, and the strain on the body of the tooth is much lessened thereby. By reason of the tapering pin C and the recess $a$ being also tapering the saw-blades may be used much longer, for when the notches become enlarged by the vibration of the teeth in operation the lower ends of the teeth may be slightly ground or filed off and the tooth seated as firmly in the enlarged recess as in any other and that without a change of detail.

Having thus described my invention, what I claim as new, and desire to secure by Letters Patent of the United States, is—

In a circular saw, the combination of the blade A, having a wedge-shaped gullet substantially radial, the chamfered edges $a'$ and $a^2$ of the blade, forming the gullet, being so curved, relatively, that the latter widens as it approaches the periphery of the blade, the edge $a^2$, having a tapering notch at $a^5$, the tooth B, having its shank shaped substantially similar to the gullet of the blade, its periphery being grooved and having a tapering notch at $b$, the notches $a^5$ and $b$ being so placed as to register on assembling the blade and tooth in their proper relative positions, forming a tapering opening, and the tapering pin C, substantially as described.

In testimony whereof I hereunto affix my signature in presence of two witnesses.

LOWELL F. ACHORN.

Witnesses:
F. C. HIGHTOWER,
CHAS. G. PEELER.